United States Patent

[11] 3,624,419

[72] Inventor Walter Frank Kosonocky
Skillman, N.J.
[21] Appl. No. 81,966
[22] Filed Oct. 19, 1970
[45] Patented Nov. 30, 1971
[73] Assignee RCA Corporation

[54] BALANCED OPTICALLY SETTABLE MEMORY CELL
7 Claims, 7 Drawing Figs.

[52] U.S. Cl. .......... 307/279, 307/238, 307/278, 307/311
[51] Int. Cl. .......... H03k 3/286, G11c 11/34
[50] Field of Search .......... 307/205, 221 C, 251, 238, 279, 304, 311, 278

[56] References Cited

UNITED STATES PATENTS

| | | | |
|---|---|---|---|
| 3,165,633 | 1/1965 | Wunderman et al. | 307/311 X |
| 3,348,064 | 10/1967 | Powlus | 307/205 |
| 3,359,432 | 12/1967 | Miller | 307/279 X |
| 3,388,292 | 6/1968 | Burns | 307/238 X |
| 3,514,765 | 5/1970 | Christensen | 307/279 X |
| 3,518,635 | 6/1970 | Cole et al. | 307/279 X |

*Primary Examiner*—John S. Heyman
*Attorney*—H. Christoffersen

ABSTRACT: An optically settable memory cell includes two MOS transistors each having a gate cross-coupled to the drain of the other transistor to provide a bistable circuit. Each transistor has a drain extending over an area of the substrate to form a photodiode. Bias potential is applied to the sources as well as the drains of the two transistors to render them nonconductive and to charge both photodiodes to the same reverse bias potential. The application of potential to the drains is interrupted while a differential input light signal is applied to the photodiodes to cause an unequal discharging of the photodiodes. Potential is then removed from the sources and restored to the drains, whereby the transistor having its gate connected to the photodiode having the greater charge is rendered conductive, and the transistors then store an optically determined information bit.

INVENTOR.
Walter F. Kosonocky
BY
Carl V. Olson
ATTORNEY

INVENTOR.
Walter F. Kosonocky
BY
Carl V. Olson
ATTORNEY

INVENTOR.
Walter F. Kosonocky
BY
Carl V. Olson
ATTORNEY

INVENTOR.
Walter F. Kosonocky
BY
Carl V. Olson
ATTORNEY

BALANCED OPTICALLY SETTABLE MEMORY CELL

The invention herein described was made in the course of, or under a contract or subcontract thereunder, with the Department of the Air Force.

BACKGROUND OF THE INVENTION

In the field of data processing and information systems, bistable semiconductor circuits or flip-flops are often used in registers and in memory arrays to store a corresponding number of binary information bits. Such registers and memory arrays are electrically accessible for the writing of binary information thereinto, and for the reading out of binary information therefrom. There is an increasing interest in computer systems including components in which binary information is also represented by optical or light signals, rather than electrical signals. It is then desirable to provide means for using a light signal to set a flip-flop. Such an "Optically Settable Flip-Flop" is described in U.S. Pat. application Ser. No. 866,565 filed on Oct. 15, 1969 by the same inventor and assigned to the same assignee as the present case.

SUMMARY OF THE INVENTION

An improved semiconductor bistable circuit is provided which is electrically accessible in the usual way, and which is also capable of being set to one or the other of its two stable states in response to input light signals. The preferred embodiment of the circuit includes two cross coupled insulated gate field effect transistors, and two photodiodes connected in a balanced fashion to control the states of the transistors in response to the differential effect of two input light signals. The balanced circuit is an order of magnitude more sensitive than known prior arrangements operating on the presence or absence of a single input light signal.

Figure 1:
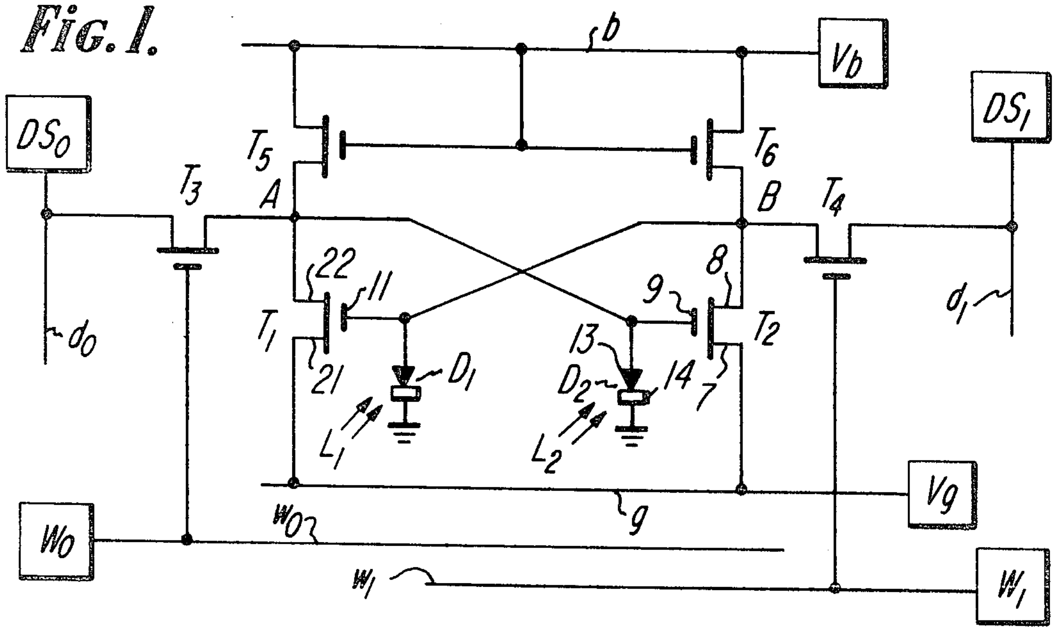
FIG. 1 is a circuit diagram of an electrically and optically settable flip-flop constructed according to the teachings of the invention.
Figure 3:
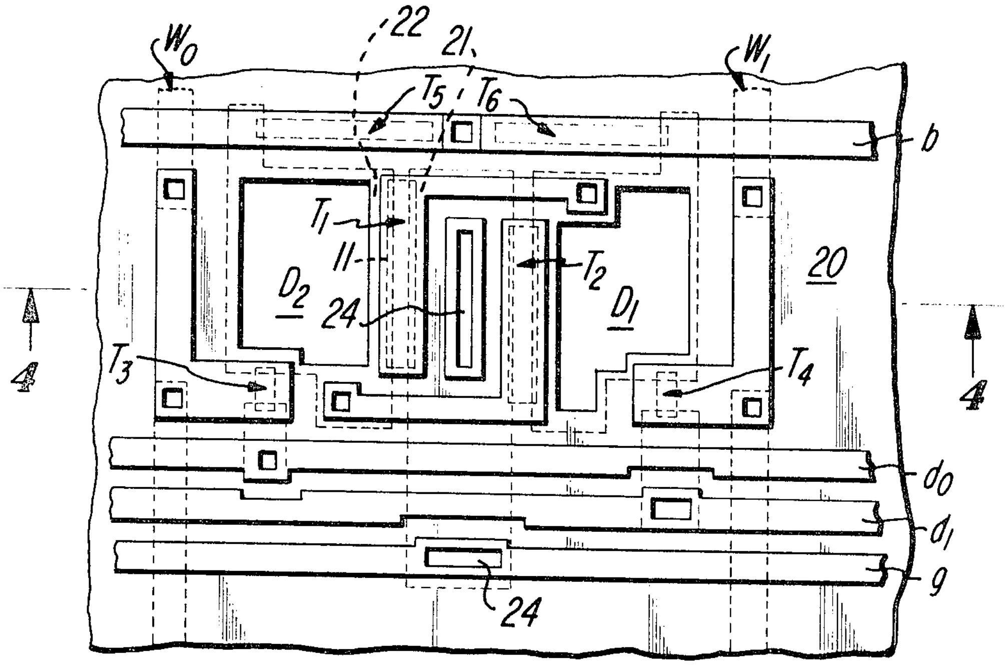
FIG. 3 is a plan view of an integrated circuit embodiment of the circuit of FIG. 1.
Figure 4:
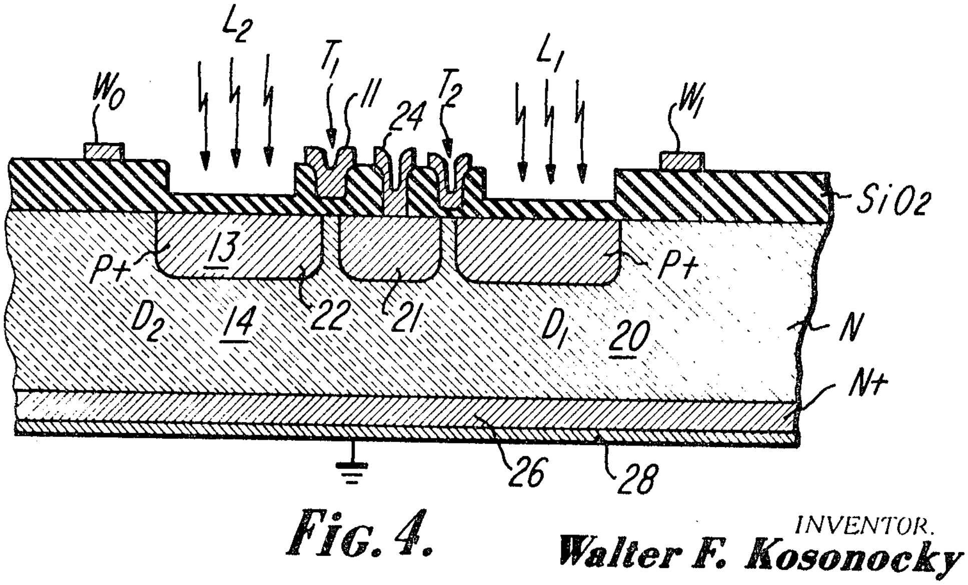
FIG. 4 is a sectional view taken on the line 4—4 in FIG. 3.

DESCRIPTION OF FIGS. 1, 3 and 4

Referring now in greater detail to FIG. 1, there is shown an electrically and optically settable bistable circuit or flip-flop. The flip-flop portion of the circuit includes cross-coupled transistors $T_1$ and $t_2$, and load impedance transistors $t_5$ and $t_6$ for the transistors $T_1$ and $T_2$, respectively The load impedance transistors $T_5$ and $t_6$ are connected to a switchable source $V_b$ of bias potential capable of supplying either a $-V$ bias potential or a reference or ground potential. The transistors $T_1$, $T_2$, $T_5$ and $T_6$ are illustrated as P-type MOS (metal oxide semiconductor) insulated gate field effect transistors (IGFETS). Each transistor includes, as shown in relation to transistor $T_2$, a source 7, a drain 8, and a gate electrode 9. The described circuit including transistors $T_1$, $T_2$, $T_5$ and $T_6$ constitutes a known bistable circuit or flip-flop.

The flip-flop is shown connected as one memory cell in an array of memory cells which includes means for electrically writing an information bit into the memory cell and reading out an information bit from the memory cell. The accessing means includes a digit drive and sense circuit $DS_O$ connected to a digit column line $d_O$, and a digit driver and sense circuit $DS_1$ connected to a digit column line $d_1$. The accessing means also includes a word driver $w_O$ connected to a word row line $w_O$, and a word driver $W_1$ connected to a word row line $w_1$. Separate word lines $w_O$ and $w_1$ are shown in FIG. 1 because they may be needed to insure geometrical symmetry in the actual circuit layout, such as the layout shown in FIG. 3. Otherwise, a single word driver and a single word line may replace drivers $W_O$ and $W_1$ and word lines $w_O$ and $w_1$.

The digit line $d_O$ is coupled through a gate transistor $T_3$ to the drain 22 or output A of transistor $T_1$, and to the gate electrode 9 of transistor $T_2$. The gate transistor $T_3$ is enabled by a signal applied to the gate electrode thereof from the word line $w_O$. The digit line $d_1$ is coupled through a gate transistor $T_4$ to the drain 8 or output B of transistor $T_2$ and to the gate electrode 11 of transistor $T_1$. Gate transistor $T_4$ is enabled by a signal from the word line $w_1$.

The circuit of FIG. 1 also includes a PN photodiode $D_2$ having one side, an anode 13, connected to the drain 22 or output A of transistor $T_1$, and to the gate 9 of transistor $T_2$. The diode $D_2$ has another side or cathode 14 connected to a point of reference potential which is the bulk silicon substrate of transistor $T_1$. When circuit is built in integrated form, the built silicon substrate is common also to transistors $T_2$ through $T_6$. A second photodiode $D_1$ has an anode connected to the drain 8 of transistor $T_2$ and to the gate electrode of transistor $T_1$.

FIGS. 3 and 4 show a physical construction of the electrically and optically settable memory element shown in circuit diagram form in FIG. 1. The circuit is constructed on an N-type silicon substrate 20 in which regions of P+ silicon are formed to serve as source and drain elements of the transistors. The P+ regions and the regions therebetween are covered with a layer of silicon dioxide, $SiO_2$, to provide electrical insulation. Conductive gate electrodes are formed over the insulated regions between respective sources and drains. Electrical conductors, formed on the silicon dioxide layer, include contact regions, such as 24, extending through openings in the silicon dioxide layer to the P+ regions below.

The transistors $T_1$ through $T_6$ shown in FIG. 1 are indicated in FIG. 3 by the same respective designations $T_1$ through $T_6$. The transistor $T_1$ is seen from FIGS. 3 and 4 to include a P+ type source 21 separated from a P+ type drain 22. A thin silicon dioxide layer overlying the area between the source 21 and the drain 22 forms an insulating region over which is positioned a conductive gate electrode 11. The digit conductor lines $d_O$ and $d_1$ are shown on top of the silicon dioxide layer. A ground line $g$ is shown on the silicon dioxide layer with a contact region 24 extending through the silicon dioxide layer to make electrical contact with the P+ material forming the source 21 of transistor $T_1$. The construction of gate transistors $T_3$ and $T_4$, and load impedance transistors $T_5$ and $T_6$, are also shown in FIG 3.

Transistors $T_1$ and $T_2$ are made large and of low-impedance relative to gate transistors $T_3$ and $T_4$, which, in turn, are large and of low impedance relative to load impedance transistors $T_5$ and $T_6$. The size of an MOS transistor is determined by the ratio of the width of the channel to the length of the channel. In accordance with these design considerations, the transistors $T_1$ and $T_2$ in FIG. 3 are seen to have channels which are relatively wide and short in length. Transistors $T_3$ and $T_4$, on the other hand, have channels that are relatively narrow and long.

The drain 22 of transistor $T_1$ is shown in FIGS. 3 and 4 to be a P+ material which is extended along the N-type substrate 20 to a relatively large rectangular area to form the photodiode $D_2$. The P+ material in this area forms the anode 13 of the photodiode $D_2$, and the N-type substrate material 20 forms the cathode 14 of the photodiode D. The large surface of the P+ material forming the photodiode $D_2$ is covered with a thin layer of silicon dioxide having a thickness equal to about one-fourth the wavelength of the light signal $L_2$, so that reflections of the light signal at the surface of the silicon are minimized. The photodiode $D_1$ is similarly constructed in relation to transistor $T_2$ to be symmetrical with photodiode $D_2$ and transistor $T_1$.

To complete the structural description, the bottom surface of the N-type silicon 20 may be provided with a thin N+ layer 26 on which is formed a metal ground layer 28. The metal ground layer 28 is externally connected to the ground conductor $g$ on the top surface of the integrated circuit. Since the construction of MOS integrated circuits is generally known, it is not necessary to describe the construction shown in FIGS. 3 and 4 in greater detail.

OPERATION OF FIG. 1

The operation of the circuit of FIG. 1 will now be described with references to the waveforms of FIG. 2. The flip-flop is assumed at time $_o$ to be in its 37 set" condition with transistor $T_1$ conducting and transistor $T_2$ cut off. The set condition of the flip-flop may have been electrically caused by applying a negative pulse to the digit line $d_1$ concurrently with the application of a negative pulse through the word line $w_1$ to the gate of transistor $T_4$. The negative pulse passed by the gate transistor $T_4$ is applied to the gate electrode of transistor $T_1$. This makes transistor $T_1$ conductive, and, through regenerative action of the cross coupled transistors, makes transistor $T_2$ nonconductive.

In order to make the circuit responsive to light, it is necessary to first charge both photodiodes $D_1$ and $D_2$ to the same value of a reverse bias potential −V. At time $t_1$, the potential on the sources of transistors $T_1$ and $T_2$ is changed from ground or reference potential to a potential equal to or somewhat more negative than −V, as shown in waveform $V_g$ in FIG. 2. Simultaneously, transistors $T_3$ and $T_4$ are enabled from word drivers $W_O$ and $W_1$ to couple −V potentials from digit drivers $DS_O$ and $DS_1$ to the anodes of photodiodes $D_1$ and $D_2$. Therefore, at the end of the interval between $t_1$ and $t_2$, transistors $T_1$ and $T_2$ are rendered nonconducting because the potential supplied to their sources from $V_g$ is equal to or more negative than the potential supplied to their drains from $DS_O$ and $DS_1$. The photodiodes $D_O$ and $D_1$ are then charged equally to the potential −V present at points A and B.

To make the photodiodes responsive solely to input light signals during the interval between $t_2$ and $t_3$, it is necessary to electrically isolate the anodes of diodes $D_1$ and $D_2$ to prevent their being maintained in a charged state by current from any electrical source. After time $t_2$, potential is no longer supplied from bias source $V_b$ through load transistors $T_5$ and $T_6$, as shown by waveform $V_b$ in FIG. 2. Transistors $T_3$ and $T_4$ are cut off by signals from word drivers $W_O$ and $W_1$ as shown in waveforms labeled $W_O$ and $W_1$ in FIG. 2. The photodiodes are then, at time $t_2$, charged to −V volts as shown by waveforms $V_A$ and $V_B$ in FIG. 2, and are electrically isolated from all sources of potential. The circuit is then ready to receive an input light signal which will result in the storage of a "1" or a "0" information bit in the bistable circuit after bias potential is reapplied.

The input light signal consists of light $L_1$ and directed to photodiode $D_1$, or light $L_2$ directed to photodiode D. Light falling on a photodiode causes a proportionate discharging of the photodiode in the interval between $t_2$ and $t_3$. If the input light signal consists solely of light $L_2$ directed to photodiode $D_2$, the charge on the anode 13 decreases toward zero as shown at 16 in waveform $V_A$ of FIG. 2, and the charge on diode $D_1$ decreases toward zero at a much slower rate as shown at 17 in waveform $V_B$ of FIG. 2. The decrease in charge in photodiode $D_1$ may be due entirely to leakage in the semiconductor material, or may be partially due to ambient or stray light impinging on photodiode $D_1$. The light sources supplying light $L_1$ and $L_2$ may be imperfect in that they cannot be switched between conditions of no light output and full light output. Then the unequal input light may be considered to be a differential light signal. In any case, there is an unequal or differential discharging of the photodiodes $D_1$ and $D_2$.

The input light signal cannot cause the potential on one photodiode to differ from the potential on the other photodiode by more than the threshold voltage of the transistors $T_1$ and $T_2$. If the difference in potential exceeds the threshold value, one of the transistors will be rendered conductive enough in the reverse direction (from drain to source) to limit the potential difference to the threshold value. This is because the potential difference is coupled from the diodes to across the gate and drain electrodes of the transistors.

Figure 2:
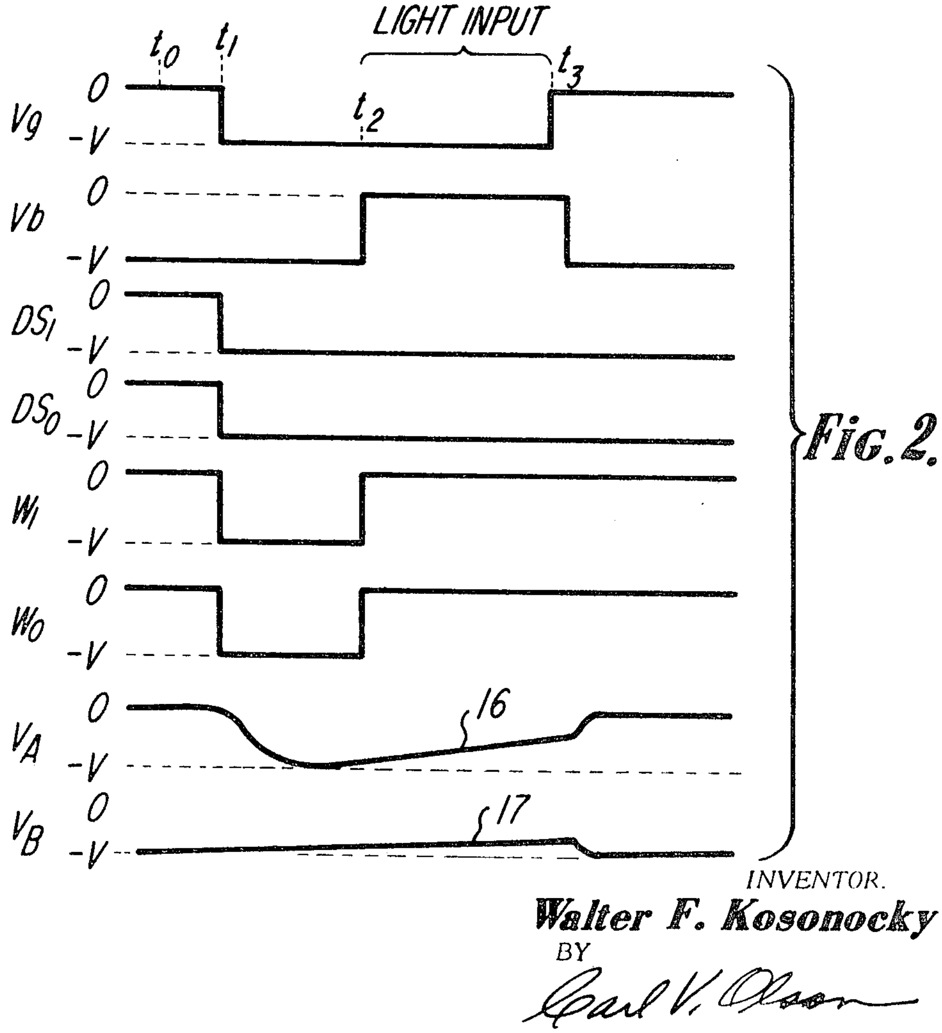
FIG. 2 is a chart of voltage waveforms which will be referred to in describing the operation of the circuit of FIG. 1.

At time $t_3$, the sources of transistors $T_1$ and $T_2$ are returned to ground potential by the operation of driver $V_g$, and the drains of transistors $T_1$ and $T_2$ are supplied with bias potential by operation of bias source $V_b$, as shown in waveforms $V_g$ and $V_b$ of FIG. 2. Then the transistors $T_1$ and $T_2$ start conducting at rates determined by the amounts of the charges coupled to the gates thereof from the anodes of the photodiodes $D_1$ and $D_2$. Since it has been assumed that light $L_2$ was greater than light $L_1$, diode $D_1$ has retained a greater negative charge than diode $D_2$, and therefore transistor $T_1$ initially conducts more than transistor $T_2$. The greater conduction in transistor $T_1$, because of the crosscoupling between the transistors, causes transistor $T_2$ to conduce less. The changes continue in a rapid regenerative manner until transistor $T_1$ conducts fully and transistor $T_2$ is cut off. The bistable circuit then stores the optically-supplied "1" information signal. If the input light signal $L_1$ had been greater than $L_2$, the result would have been the rendering of transistor $T_2$ conductive and the storage of a "0" information signal in the bistable circuit.

Figures 5, 6:
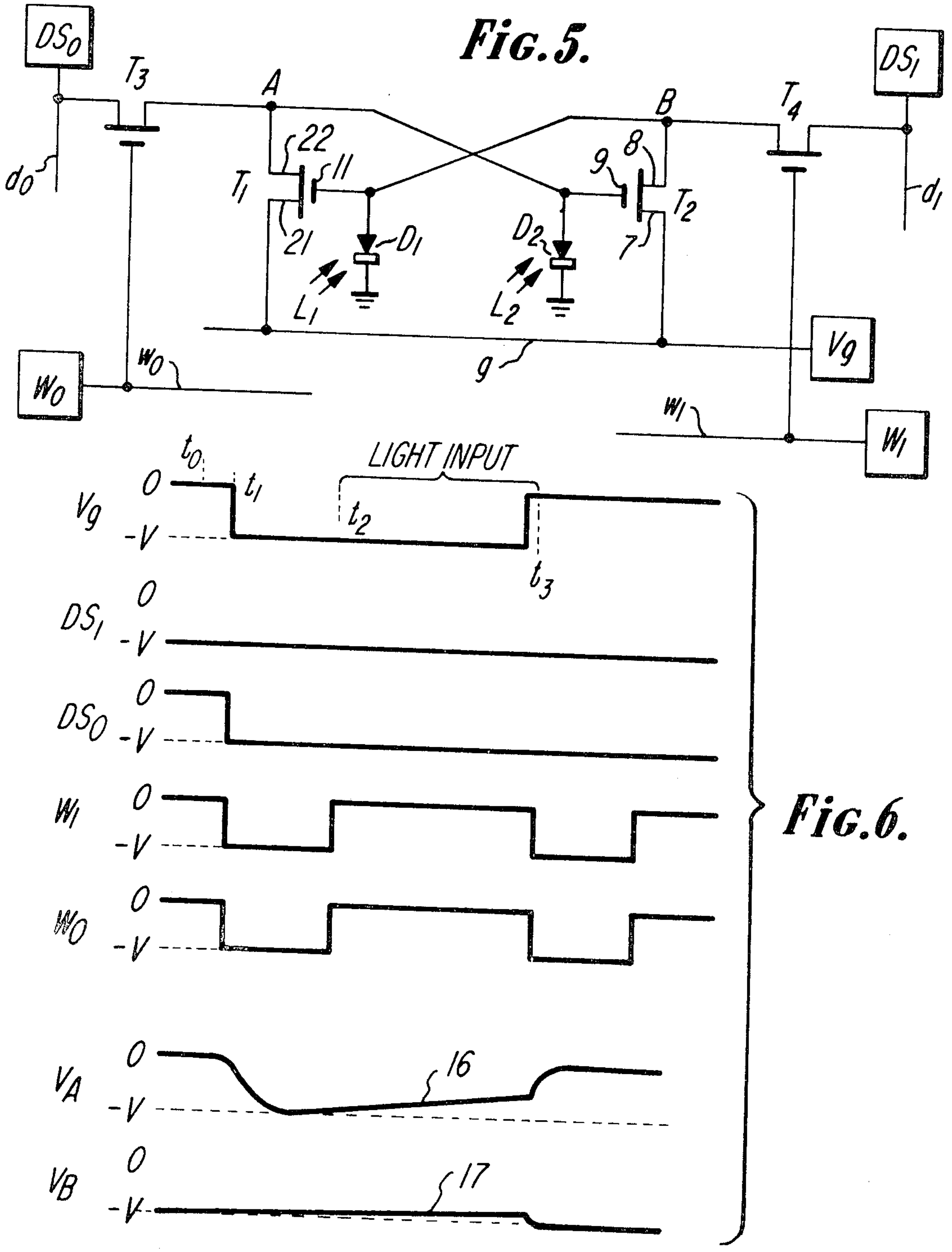
FIG. 5 is a circuit diagram of an electrically and optically settable flip-flop of the type requiring only intermittent application of bias potential.
FIG. 6 is a chart of voltage waveforms which will be referred to in describing the operation of the circuit of FIG. 5.
Figure 7:
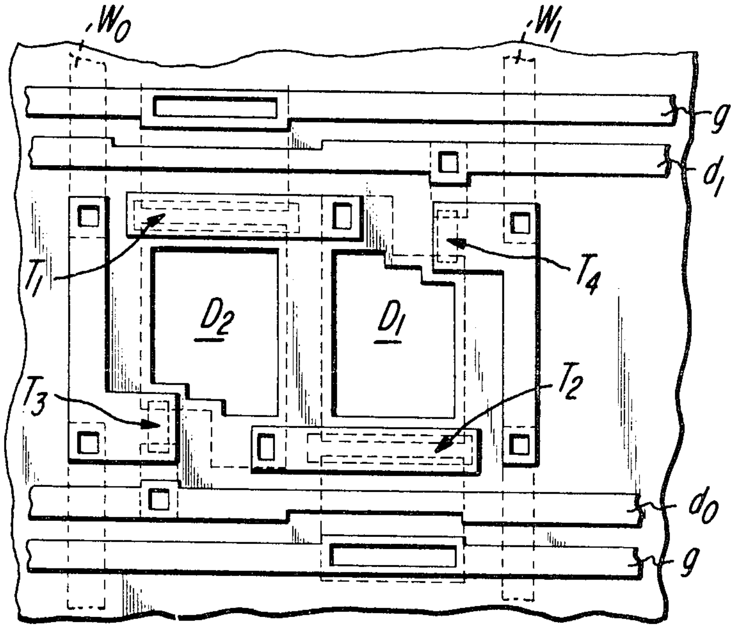
FIG. 7 is a plan view of an integrated circuit embodiment of the circuit of FIG. 5.

DESCRIPTION of FIGS. 5 AND 7

Reference is now made to FIG. 5 for a description of an electrically and optically settable bistable circuit which is the same as the circuit of FIG. 1 except that the bias source $V_b$ is omitted, and the load impedance transistors $T_5$ and $T_6$ are omitted. The elements in FIG. 5 are given the same numerals and designations as corresponding elements in FIG. 1.

The bistable circuit of FIG. 5 is electrically set to one or the other of its two information states by electrical signals applied from digit drivers $DS_O$ and $DS_1$ through gate transistors $T_3$ and $T_4$ when enabled by signals from word drivers $W_O$ and $W_1$. The transistors $T_3$ and $T_4$ act as also load impedance transistors and the electrical signals cause one of transistors $T_1$ and $T_2$ to be conducting and the other to be nonconducting. In this condition, the drain of the nonconducting one of transistors $T_1$ and $T_2$ has an electrical charge relative to the semiconductor substrate. This charge gradually leaks away when the digit drive voltages are removed. However, potentials from the digit drivers may be periodically reapplied to utilize the remaining charge to reestablish or refresh the stored information state of the bistable circuit. This refreshment may be accomplished at intervals of milliseconds or even seconds, depending on the rate of charge leakage in the substrate.

FIG. 7 shows the layout of the elements of the circuit of FIG. 5 on a semiconductor substrate. The layout of elements in FIG. 7 is such that there is complete symmetry between the two sides of the bistable circuit. A symmetrical layout is desirable in order to insure that the charges on the two photodiodes $D_1$ and $D_2$ are initially established at the same potential, are not unequally affected by applied potentials, and the photodiodes are discharged solely in proportion to the amounts of input signal light impinging thereon.

OPERATION OF FIG. 5

The operation of the bistable circuit of FIG. 5 is similar to the operation of the circuit of FIG. 1, except that solely gate transistors $T_3$ and $T_4$ are available for applying potentials through points A and B to the drains and gates of transistors $T_1$ and $T_2$.

It is assumed that, at time $t_O$ in FIG. 6, the bistable circuit is in the state in which transistor $T_1$ is fully conducting by reason of the prior application of a −V potential through gate transistor $T_4$ to the gate electrode 11 of transistor $T_1$. Transistor $T_2$ is nonconducting because of the cross connection from the drain 22 of transistor $T_1$ to the gate 9 of transistor $T_2$.

At time $t_1$, a $-V$ bias potential is coupled from digit drivers $DS_O$ and $DS_1$ through gate transistors $T_3$ and $T_4$, which are enabled by signals from word drivers $W_O$ and $W_1$, to the drains of transistors $T_1$ and $T_2$. The corresponding waveforms are labeled $DS_1$, $DS_O$, $W_1$ and $W_O$ in FIG. 6. At the same time $t_{O-1}$, a substantially equal or greater negative potential is applied from potential source $V_g$ over ground line $g$ to the sources of transistors $T_1$ and $T_2$. Under these conditions, the sources of potential tend to establish a zero or reverse potential difference across the source and drain electrodes of transistors $T_1$ and $T_2$, and the previously conducting transistor $T_1$ is thus also rendered nonconducting at time $t_2$. In this interval between time $t_1$ and $t_2$, the negative potentials applied to points A and B cause a charging of the photodiodes $D_1$ and $D_2$ until both photodiodes are equally charged to the potential $-V$, as shown by waveforms $V_A$ and $V_B$.

At time $t_2$, the application of potential to the drains of transistors $T_1$ and $T_2$ is interrupted by an interruption of the enabling potentials to the gates of transistors $T_3$ and $T_4$ from the word drivers $W_O$ and $W_1$. Then, in the interval between $t_2$ and $t_3$, a differential input light signal is applied to the photodiodes $D_1$ and $D_2$ to cause an unequal discharging of the photodiodes. It is assumed that light signal $L_2$ is greater than light signal $L_1$ so that photodiode $D_2$ is discharged at a greater rate than photodiode $D_1$. The relatively greater discharging of the charge on photodiode $D_2$ is represented at 16 in waveform $V_A$ in FIG. 6, relative to the discharging of the photodiode $D_1$ as represented at 17 in waveform $V_B$ of FIG. 6. During this discharging of the photodiodes as a result of impinging light signals, the photodiodes are electrically isolated from sources of potential that might otherwise affect the charges thereon.

At time $t_3$, the negative potential previously applied over line $g$ to the sources of transistors $T_1$ and $T_2$ is discontinued, and bias potential is restored through points A and B to the drains of transistors $T_1$ and $T_2$. When this occurs, the photodiode still having the greater negative charge tends to render the associated transistor conducting. In the present example, photodiode $D_1$ retains the greater negative charge, which is applied to the gate electrode 11 of transistor $T_1$ and tends to make the transistor conductive. With every increment of conduction in transistor $T_1$, there is a regenerative feedback from the drain 22 of the transistor $T_1$ through point A to the gate electrode of transistor $T_2$ which tends to reduce conduction in transistor $T_2$. The circuit thus quickly assumes a condition in which transistor $T_1$ is fully conductive and transistor $T_2$ is nonconductive. The circuit then is in the condition of electrically storing the optically determined "1" information bit supplied by the differential input light signal $L_1$ and $L_2$. Thereafter, the stored information may be read out electrically in the usual known manner, and the procedure for receiving the next subsequent input light signal may be repeated. Of course, if the potential $L_1$ of the input light signal had been greater than the potential of $L_2$, the transistor $T_2$ would have been rendered solely conductive, with transistor $T_1$ cut off, to store the other or "O" information bit in the circuit.

The sensitivity of the optically settable bistable circuits of FIGS. 1 and 5 depends on the degree of symmetry and dimensional equivalence of the two sides of the circuits. Sensitivity is also increased when the transistors $T_1$ and $T_2$ are constructed to have the same threshold voltages.

While the invention has been described as being constructed using P–MOS field effect transistor technology, it will be understood that it can also be constructed by those skilled in the art using N-channel MOS, or complementary MOS technology. Further, the foregoing constructions can be of the bulk silicon type or the silicon-on-sapphire type.

What is claimed is:

1. An optically settable memory cell, comprising first and second IGFET transistors having a substrate of one conductivity type, and each having a source and a drain of the opposite conductivity type, each transistor having a gate cross coupled to the drain of the other transistor, and each transistor having a drain extending over an area of said substrate to form a photodiode, means to couple a first potential to the drains of said first and second transistors, means to apply a second potential of the same polarity to the sources of said transistors to render both transistors nonconductive and to charge both photodiodes to the same reverse bias potential, means to interrupt the application of said first potential to said drains and to apply a differential input light signal to said photodiodes to cause an unequal discharging of said photodiodes, and means to discontinue the application of said second potential to said sources and to restore said first potential to said drains, whereby the transistor having its gate connected to the photodiode having the greater charge is rendered conductive, and the transistors then store an optically determined information bit.

2. A memory cell as defined in claim 1 wherein said means to couple a first potential to the drains of the first and second transistors includes the source-drain paths of third and fourth transistors, respectively.

3. A memory cell as defined in claim 2, and in addition, digit lines connecting said first potential source through said third and fourth transistors to said first and second transistors, and word lines connected to the gates of said third and fourth transistors, whereby to render one or the other of said first and second transistors conductive for the storage of a "1" or "0" information bit.

4. A memory cell as defined in claim 1, and in addition, "1" and "0" digit lines connected through the source-drain paths of respective third and fourth transistors to the drains of said first and second transistors, and "1" and "0" word lines connected to gates of respective third and fourth transistors, whereby to render one or the other of said first and second transistors conductive for the storage of a "1" or "0" information bit.

5. A memory cell as defined in claim 4 wherein said means to couple a first potential to the drains of said first and second transistors includes fifth and sixth load impedance transistors, respectively.

6. A memory cell as defined in claim 1 wherein said means to couple a first potential to the drains of said first and second transistors includes two load impedance transistors.

7. An electrically and optically settable memory cell, comprising first and second MOS transistors having a substrate of one conductivity type, and each having a source and a drain of the opposite conductivity type, each transistors having a gate cross coupled to the drain of the other transistor to provide a bistable circuit, and each transistor having a drain extending over an area of said substrate to form a photodiode, load impedance transistors coupling a first potential to the drains of said first and second transistors, electrical signal input means including digit lines, word lines and third and fourth transistors to render one or the other of said first and second transistors conductive for the storage of an information bit, means to apply a second potential of the same polarity to the sources of said first and second transistors to render both transistors nonconductive and to charge both photodiodes to the same reverse bias potential, means to disconnect said first potential from said transistor impedance means and thereby interrupt the application of the first potential to the drains of said first and second transistors, and to apply a differential input light signal to said photodiodes to cause an unequal discharging of said photodiodes, and means to discontinue the application of said second potential to the sources of said first and second transistors and to restore said first potential through the load impedance transistors to the drains of the first and second transistors, whereby the transistor having its gate connected to the photodiode having the greater charge is rendered conductive, and the transistors then store an optically determined information bit.

* * * * *

UNITED STATES PATENT OFFICE
CERTIFICATE OF CORRECTION

Patent No. 3,624,419 Dated November 30, 1971

Inventor(s) Walter Frank Kosonocky

It is certified that error appears in the above-identified patent and that said Letters Patent are hereby corrected as shown below:

Column 1, line 59, "$t_2$" should read ---$T_2$---; "$t_5$" should read ---$T_5$---; "$t_6$" should read ---$T_6$---; line 60, after "respectively" insert ---.---; line 61, "$t_6$" should read ---$T_6$---.

Column 2, line 2, "$w_0$" should read ---$W_0$---; line 23, after "when" insert ---the---; line 23, "built" should read ---bulk---; line 54, delete "-".

Column 3, line 14, delete "37"; line 14, before "set" insert ---"---; line 55, delete "and"; line 56, "D" should read ---$D_2$---.

Column 5, line 5, after "to" delete ---$_{-1}$---; line 75, after "cross" insert --- - ---.

Column 6, line 19, after "optically" insert --- - ---; line 52, after "cross" insert --- - ---.

Column 7, line 3, after "optically" insert --- - ---.

Signed and sealed this 18th day of July 1972.

(SEAL)
Attest:

EDWARD M.FLETCHER,JR.
Attesting Officer

ROBERT GOTTSCHALK
Commissioner of Patents